(12) United States Patent
Ito

(10) Patent No.: US 7,773,783 B2
(45) Date of Patent: Aug. 10, 2010

(54) FACE DETECTING METHOD AND PHOTOGRAPHY APPARATUS USING THE METHOD

(75) Inventor: Wataru Ito, Kanagawa-ken (JP)

(73) Assignee: Fujifilm Corporation (JP)

( * ) Notice: Subject to any disclaimer, the term of this patent is extended or adjusted under 35 U.S.C. 154(b) by 806 days.

(21) Appl. No.: 11/727,329

(22) Filed: Mar. 26, 2007

(65) Prior Publication Data

US 2007/0223812 A1 Sep. 27, 2007

(30) Foreign Application Priority Data

Mar. 27, 2006 (JP) .............................. 2006-085544

(51) Int. Cl.
*G06K 9/00* (2006.01)
(52) U.S. Cl. .................. 382/118; 382/165; 382/224
(58) Field of Classification Search ............... 382/103, 382/118, 164, 165, 224, 226, 227
See application file for complete search history.

(56) References Cited

U.S. PATENT DOCUMENTS

| | | | |
|---|---|---|---|
| 5,819,247 A | 10/1998 | Freund et al. | |
| 6,504,942 B1 * | 1/2003 | Hong et al. | 382/103 |
| 7,190,829 B2 * | 3/2007 | Zhang et al. | 382/165 |
| 7,505,621 B1 * | 3/2009 | Agrawal et al. | 382/159 |
| 2002/0102024 A1 | 8/2002 | Jones et al. | |

* cited by examiner

*Primary Examiner*—Phuoc Tran
(74) *Attorney, Agent, or Firm*—Studebaker & Brackett PC; Donald R. Studebaker (57) ABSTRACT

Processing speed is improved, by decreasing the amount of calculations required in face detecting processes. A human subject is photographed, and light is received by light receiving elements for each color component, to obtain pieces of pixel data. Next, a raw color image is generated from the pixel data, and a green signal image is generated from green pixel data. Thereafter, faces within the raw image are detected, by performing face detecting processes on the green signal image.

6 Claims, 6 Drawing Sheets

FACE DETECTING METHOD AND PHOTOGRAPHY APPARATUS USING THE METHOD

BACKGROUND OF THE INVENTION

1. Field of the Invention

The present invention relates to a face detecting method for judging whether an image represents a human face, and a photography apparatus that employ the face detecting method.

2. Description of the Related Art

The basic principle of face detection, for example, is classification into two classes, either a class of faces or a class not of faces. A technique called "boosting" is commonly used as a classification method for classifying faces (refer to, for example, U.S. Pat. No. 5,819,247). The boosting algorithm is a learning method for classifiers that links a plurality of weak classifiers to form a single strong classifier.

U.S. Patent Application Publication No. 20020102024 discloses a method that speeds up face detecting processes by the boosting technique. In this method, the weak classifiers are provided in a cascade structure, and only images which have been judged to represent faces by upstream weak classifiers are subject to judgment by downstream weak classifiers.

Face detection employing the boosting algorithm such as that disclosed in U.S. Pat. No. 5,819,247 generally employs brightness data (Y signals) of images. On the other hand, image data obtained by digital cameras and the like often are RGB signals. Accordingly, when face detecting processes are administered onto images obtained by digital cameras and the like, it becomes necessary to generate Y signals from the RGB signals. This increases the amount of data to be processed, and prevents face detection from being expedient. Particularly in cases that face detecting apparatuses are incorporated into digital cameras and face detecting processes are administered onto images immediately after obtainment thereof, the Y signal generating process becomes a large factor in preventing fast face detection.

SUMMARY OF THE INVENTION

The present invention has been developed in view of the foregoing circumstances. It is an object of the present invention to provide a face detecting method and a photography apparatus that employs the face detecting method.

The face detecting method of the present invention comprises the steps of:

receiving light incident from a human subject for each color component, to obtain a plurality of pieces of pixel data;

generating a raw image of the human subject employing the obtained plurality of pieces of pixel data;

generating a green signal image employing green pixel data, which are among the plurality of pieces of pixel data, obtained by receiving green components of light from the human subject; and detecting a facial image within the raw image by detecting the facial image within the green signal image.

The photography apparatus of the present invention comprises:

imaging means, for receiving light incident from a human subject for each color component, to obtain a plurality of pieces of pixel data;

image generating means, for generating a raw image of the human subject employing the obtained plurality of pieces of pixel data and for generating a green signal image employing green pixel data, which are among the plurality of pieces of pixel data, obtained by receiving green components of light from the human subject; and face detecting means, for detecting a facial image within the raw image by detecting the facial image within the green signal image.

Here, the color components may be any color components as long as they include green color components. Examples of such color components are those included in RGB (Red, Green Blue) signals and CYMG (Cyan, Yellow, Magenta, Green) signals.

The face detecting means may detect facial images by any method, and may comprise, for example:

partial image generating means, for generating a plurality of partial images by scanning a subwindow, which is a frame surrounding a set number of pixels; and face classifiers, for performing final discrimination regarding whether the plurality of partial images represent faces, employing discrimination results of a plurality of weak classifiers.

Note that the face classifiers may discriminate facial images by any method, as long as the final discrimination is based on the discrimination results of a plurality of weak classifiers. For example, a configuration may be adopted, wherein:

the plurality of weak classifiers are arranged in a cascade structure; and discrimination is performed by downstream weak classifiers only on partial images which have been discriminated to represent faces by upstream weak classifiers.

The face detecting means may further comprise a candidate detecting means, for discriminating whether the partial images represent faces and detecting partial images that possibly represent faces as candidate images; and the face classifiers may discriminate whether the candidate images detected by the candidate detecting means represent faces.

The face detecting method and the photography apparatus of the present invention receive light incident from human subjects for each color component, to obtain a plurality of pieces of pixel data; generate raw images of the human subject employing the obtained plurality of pieces of pixel data; generate green signal images employing green pixel data, which are among the plurality of pieces of pixel data, obtained by receiving green components of light from the human subject; and detect facial images within the raw images by detecting the facial images within the green signal images. Therefore, the extraction of brightness data from the RGB signals that constitute the raw images, which had heretofore been necessary, becomes unnecessary. Accordingly, the amount of calculations involved in the face detecting process can be reduced, and processing speeds can be improved.

Note that a configuration may be adopted, wherein the face detecting means comprises partial image generating means, for generating a plurality of partial images by scanning a subwindow, which is a frame surrounding a set number of pixels; and face classifiers, for performing final discrimination regarding whether the plurality of partial images represent faces, employing discrimination results of a plurality of weak classifiers. In this case, detection of facial images can be performed efficiently and accurately.

Note that a configuration may be adopted, wherein: the plurality of weak classifiers are arranged in a cascade structure; and discrimination is performed by downstream weak classifiers only on partial images which have been discriminated to represent faces by upstream weak classifiers. In this case, the number of partial images to be discriminated by downstream weak classifiers can be greatly reduced. Accordingly, the discriminating process can be further expedited.

Further, a configuration may be adopted, wherein: the face detecting means further comprises a candidate detecting means, for discriminating whether the partial images represent faces and detecting partial images that possibly represent faces as candidate images; and the face classifiers discriminate whether the candidate images detected by the candidate detecting means represent faces. In this case, the number of partial images to be discriminated by the face classifiers can be reduced. Accordingly, the discriminating process can be further expedited.

DESCRIPTION OF THE PREFERRED EMBODIMENTS

Figure 1:
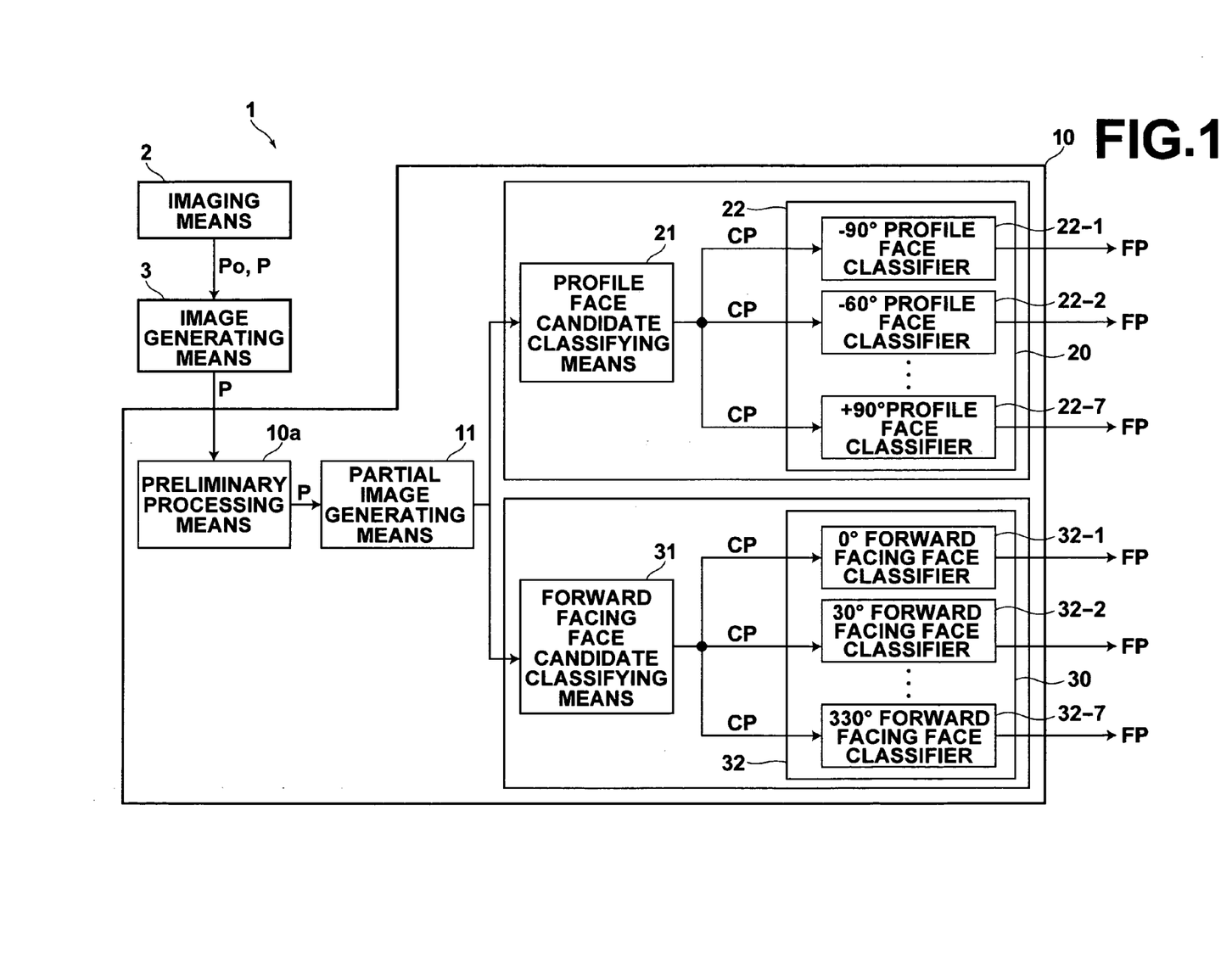
FIG. 1 is a schematic block diagram that illustrates the construction of a photography apparatus according to an embodiment of the present invention.

Hereinafter, an embodiment of the present invention will be described with reference to the attached drawings. FIG. 1 is a schematic block diagram that illustrates the construction of a photography apparatus 1 according to the embodiment of the present invention. The photography apparatus 1 comprises: an imaging means 2, for obtaining a plurality of pieces of pixel data Px by receiving light from human subjects with a plurality of light receiving elements 2a for each color component; an image generating means 3, for generating raw images P0 and green signal images P of the human subjects employing the plurality of pieces of pixel data Px, and a face detecting means 10, for detecting facial images FP within the raw images P0, by detecting the facial images FP within the green signal images P.

Figure 2A:
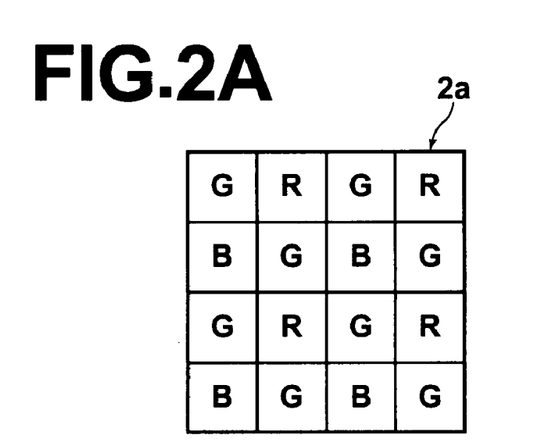
FIGS. 2A, 2B, and 2C are schematic diagrams that illustrate examples of arrangements of light receiving elements within an imaging means of the photography apparatus of FIG. 1.
Figure 2B:
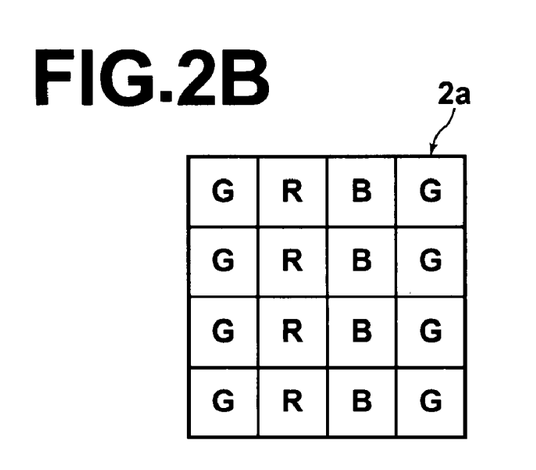
Figure 2C:
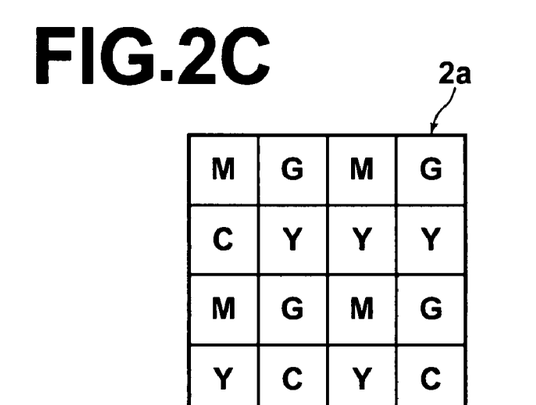

As illustrated in FIG. 2A, the imaging means 2 comprises the plurality of light receiving elements 2a for receiving light from human subjects for each color component (RGB). Each light receiving element 2a receives light of a particular color component, and obtains pixel data Px by photoelectric conversion. In the case that the light receiving elements 2a are provided in the so-called Bayer fashion, as illustrated in FIG. 2A, the light receiving elements 2a for receiving green components of light are arranged at a predetermined pitch, and thinned out green pixel data can be obtained thereby. Note that the arrangement of the light receiving elements of the imaging means 2 may be in the form of stripes, as illustrated in FIG. 2B. Alternatively, each of the light receiving elements 2a may be that which receives one of cyan, yellow, magenta, and green components of light, as illustrated in FIG. 2C. Further, the light receiving elements 2a may be arranged in the shape of a honeycomb.

The image generating means 3 generates images employing the pixel data Px obtained by the imaging means 2. The image generating means 3 generates raw images P0, which are color images that employ the plurality of pieces of pixel data for RGB (or CYMG) components, and green signal images P, which are images that only employ the pieces of pixel data for green components. Note that because the light receiving elements 2a for receiving the green components of light are provided in a predetermined arrangement as illustrated in FIGS. 2A, 2B, and 2C, the image generating means 3 is capable of generating two dimensional green signal images P.

The face detecting means 10 administers a face detecting process that employs an adaboosting algorithm or the like onto the green signal image P generated by the image generating means 3. The face detecting means 10 comprises: a partial image generating means 11, for scanning a subwindow W over the green signal image P to generate partial images PP; a profile face detecting means 20, for detecting partial images that represent faces in profile; and forward face detecting means 30, for detecting partial images that represent faces facing forward.

Preliminary processes are administered on the green signal images P by a preliminary processing means 10a, prior to the green signal images P being input to the partial image generating means. Because RGB signals are proportionate to light intensity, the preliminary processing means 10a administers gamma conversion on the green pixel data to approach contrast as perceived by humans. Specifically, the preliminary processing means 10a generates gamma converted green signals by administering conversion, such as green signal value=log(G), green signal value=$G^{2.2}$, or conversion according to a lookup table. Further, the preliminary processing means 10a generates green signal images P2, P3, and P4 having different resolutions, from the green signal images P, as illustrated in FIGS. 3A through 3D. Still further, the preliminary processing means 10a administers a normalizing process (hereinafter, referred to as a "local normalizing process") that suppresses fluctuations in contrast within local regions of the plurality of green signal images P, across the entireties of the green signal images P.

Figure 3A:
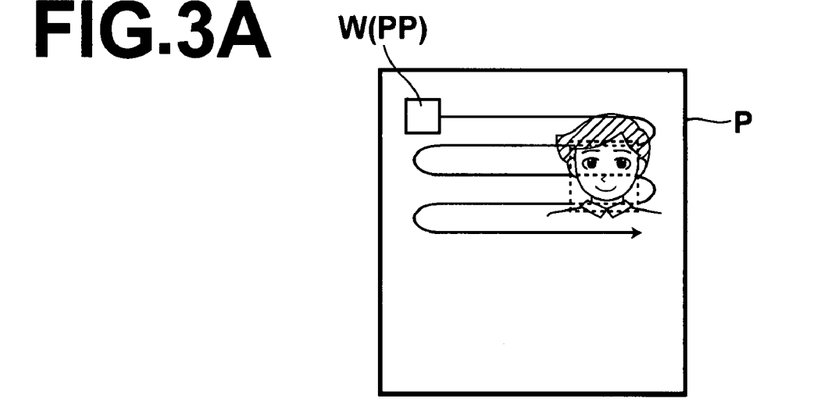
FIGS. 3A, 3B, 3C, and 3D are diagrams that illustrate how a partial image generating means of FIG. 1 scans subwindows.

As illustrated in FIG. 3A, the partial image generating means 11 scans the subwindow W having a set number of pixels (32 pixels by 32 pixels, for example) within the entire green signal image P, and cuts out regions surrounded by the subwindow W to generate the partial images PP having a set number of pixels.

Figure 3B:
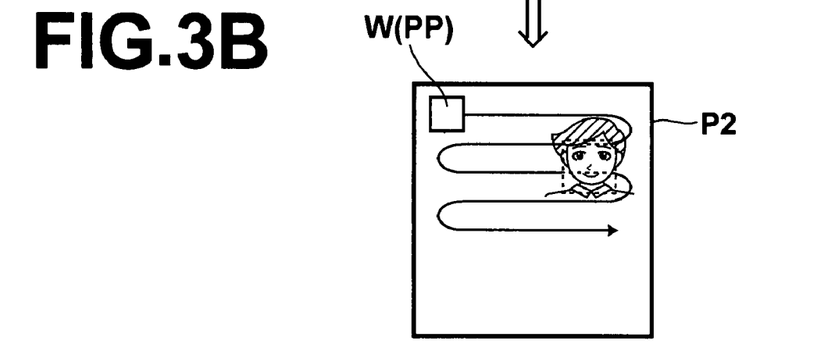
Figure 3C:
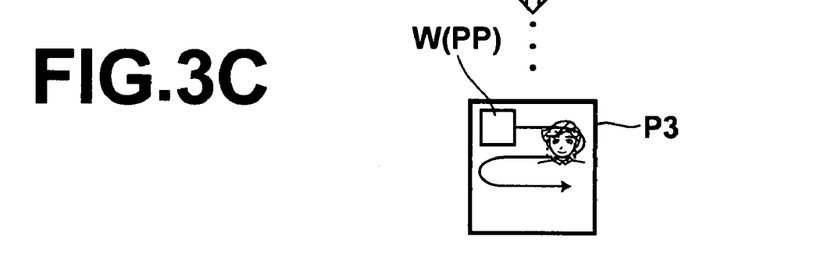
Figure 3D:
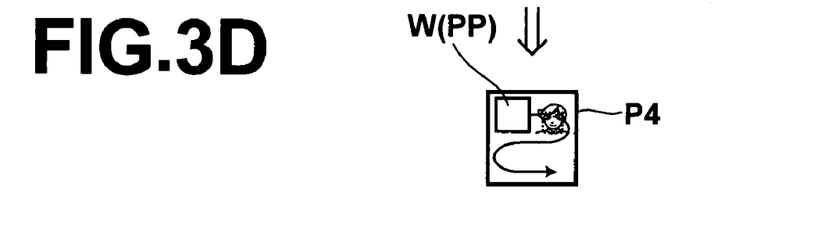

Note that the partial image generating means 11 also generates partial images PP by scanning the subwindow W within the generated lower resolution images P2, P3, and P4 as well, as illustrated in FIGS. 3B through 3D. Thereby, even in the case that a face (discrimination target) pictured in the green signal image P does not fit within the subwindow W, it becomes possible to fit the face within the subwindow W in a lower resolution image. Accordingly, faces can be positively detected.

The profile face detecting means 20 detects partial images that represent faces in profile from among the plurality of partial images PP. The profile face detecting means 20 comprises a profile face candidate classifying means 21, and a profile face classifying means 22. The profile face candidate classifying means 21 discriminates whether each of the plurality of partial images PP represent faces in profile, and outputs partial images PP that possibly represent faces in profile to the profile face classifying means 22, as candidate images CP. The profile face classifying means 22 discriminates whether each of the candidate images CP detected by the profile face candidate classifying means 21 and output thereto represent faces in profile.

Figure 4:
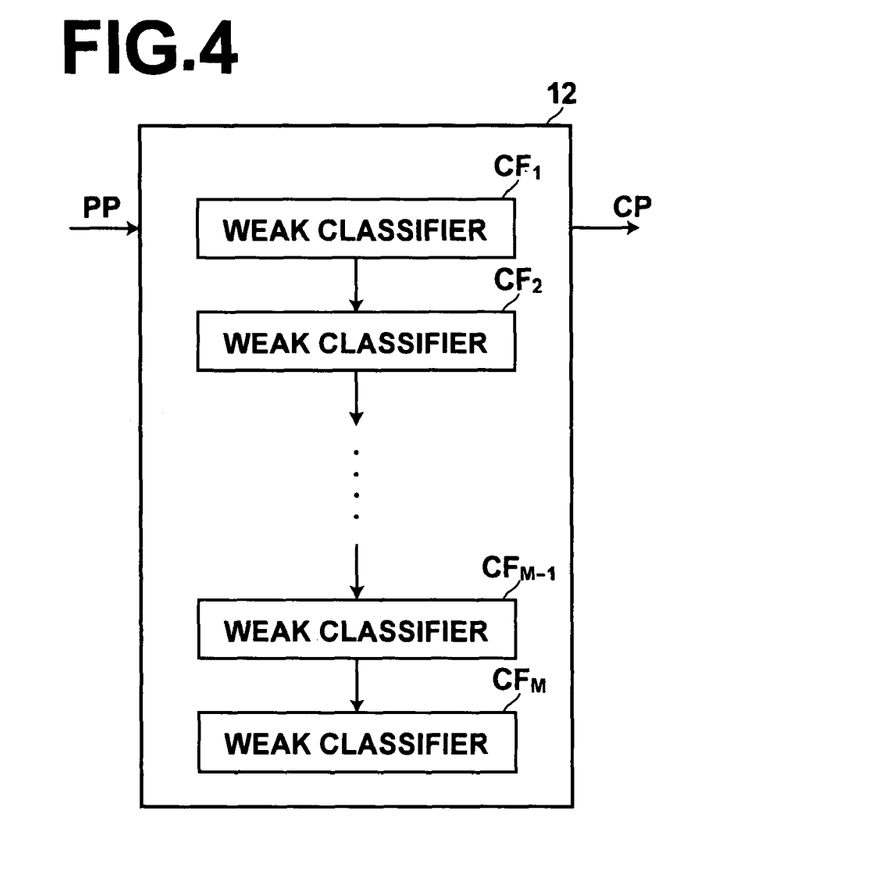
FIG. 4 is a block diagram that illustrates an example of a candidate classifier.
Figure 5:
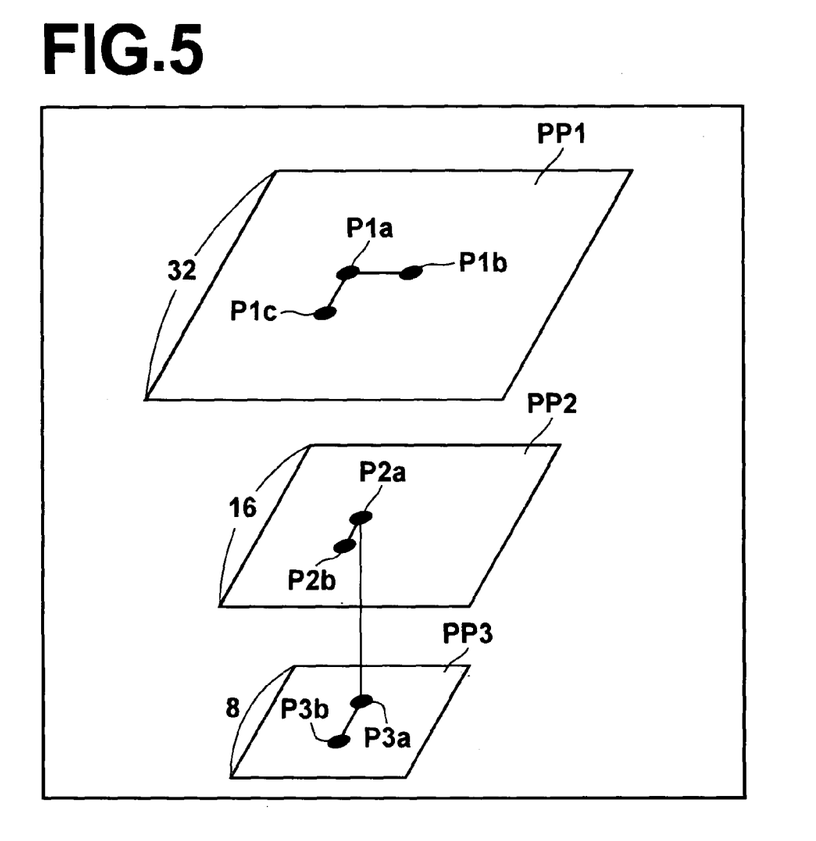
FIG. 5 is a diagram that illustrates how characteristic amounts are extracted from partial images, by the candidate classifier of FIG. 4.

The profile face candidate classifying means 21 functions to perform binary discrimination regarding whether the partial images PP represent faces in profile, and comprises a plurality of classifiers, each constituted by weak classifiers $CF_1$ through $CF_M$ (M is the number of weak classifiers), as illustrated in FIG. 4. The profile face candidate classifying means 21 is that which has performed learning by the AdaBoosting algorithm, and comprises the plurality of weak classifiers $CF_1$ through $CF_M$. Each of the weak classifiers $CF_1$ through $CF_M$ extracts characteristic amounts x from the partial images PP, and discriminates whether the partial images PP represent faces employing the characteristic amounts x. The profile face candidate classifying means 21 performs final judgment regarding whether the partial images PP represent faces, employing the discrimination results of the weak classifiers $CF_1$ through $CF_M$.

Specifically, each of the weak classifiers $CF_1$ through $CF_M$ extracts green signal values of coordinate positions P1a, P1b, and P1c within the partial images PP, as illustrated in FIG. 4. Further, green signal values of coordinate positions P2a, P2b, P3a, and P3b are extracted from lower resolution images PP2 and PP3 of the partial images PP, respectively. Thereafter, the seven coordinate positions P1a through P3b are combined as pairs, and the differences in green signal values of each of the pairs are designated to be the characteristic amounts x. Each of the weak classifiers $CF_1$ through $CF_M$ employs different characteristic amounts. For example, the weak classifier $CF_1$ employs the difference in green signal values between coordinate positions P1a and P1c as the characteristic amount x, while the weak classifier $CF_2$ employs the difference in green signal values between coordinate positions P2a and P2b as the characteristic amount x.

Note that a case has been described in which each of the weak classifiers $CF_1$ through $CF_M$ extracts characteristic amounts x. Alternatively, the characteristic amounts x may be extracted in advance for a plurality of partial images PP, then input into each of the weak classifiers $CF_1$ through $CF_M$.

Figure 6:
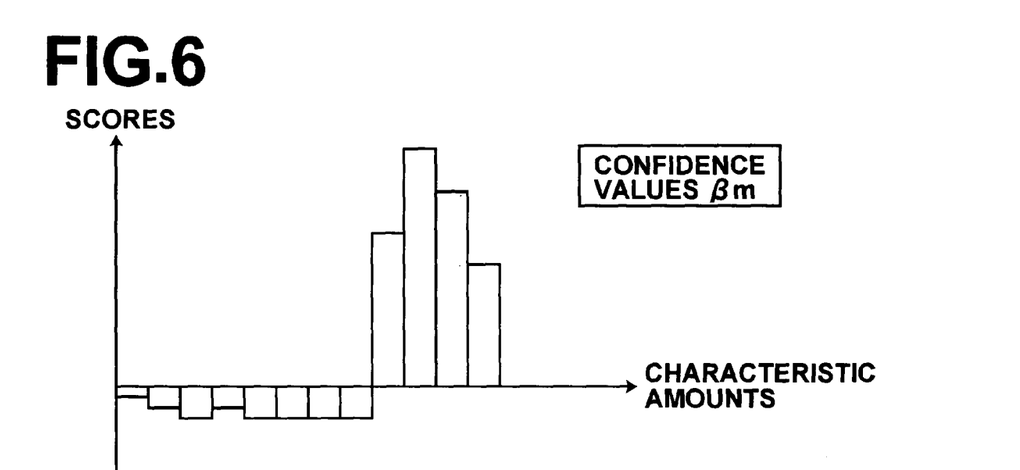
FIG. 6 is a graph that illustrates an example of a histogram of the weak classifier of FIG. 4.

Each of the weak classifiers $CF_1$ through $CF_M$ has a histogram such as that illustrated in FIG. 6. The weak classifiers $CF_1$ through $CF_M$ output scores f1(x) through fM(x) according to the values of the characteristic amounts x based on these histograms. Further, the weak classifiers $CF_1$ through $CF_M$ have confidence values $\beta_1$ through $\beta_M$ that represent the levels of discrimination performance thereof. The weak classifiers $CF_1$ through $CF_M$ calculate discrimination scores $\beta_M \cdot f_M(x)$ by multiplying the scores f1(x) through $f_M(x)$ by the confidence values $\beta_1$ through $\beta_M$. Whether the discrimination score $\beta_M \cdot f_M(x)$ of each weak classifier $CF_m$ is greater than or equal to a threshold value Sref is judged. A partial image PP is judged to represent a face when the discrimination score $\beta_M \cdot f_M(x)$ is equal to or greater than the threshold value Sref ($\beta_M \cdot f_M(x) > $Sref).

The weak classifiers $CF_1$ through $CF_M$ of the profile face candidate classifying means 21 are configured in a cascade structure. Only partial images PP which have been judged to represent faces by all of the weak classifiers $CF_1$ through $CF_M$ are output as candidate images CP. That is, discrimination is performed by a downstream weak classifier $CF_{m+1}$ only on partial images in which faces have been discriminated by the weak classifier $CF_m$. Partial images PP in which faces have not been discriminated by the weak classifier $CF_m$ are not subjected to discrimination operations by the downstream weak classifier $CF_{m+1}$. The number of partial images PP to be discriminated by the downstream weak classifiers can be reduced by this structure, and accordingly, the discrimination operations can be accelerated.

Note that in the case described above, each of the discrimination scores $\beta_M \cdot f_M(x)$ are individually compared against the threshold value Sref to judge whether a partial image PP represents a face. Alternatively, discrimination maybe performed by comparing the sum $\Sigma_{r=1}^{m} \beta_r \cdot f_r(x)$ of the discrimination scores of upstream weak classifiers $CF_1$ through $CF_{m-1}$ against a predetermined threshold value S1ref ($\Sigma_{r=1}^{m} \beta_r \cdot f_r(x) > $S1ref). The discrimination accuracy can be improved by this method, because judgment can be performed while taking the discrimination scores of upstream weak classifiers into consideration.

Next, the profile face classifying means 22 will be described with reference to FIG. 1. The profile face classifying means 22 comprises: a 0° profile face classifier 22-1, for discriminating faces in which the direction that the face is facing within the image (angle) is 0°, that is, forward facing faces; a 30° profile face classifier 22-2, for discriminating faces in which the aforementioned angle is 30°; and profile face classifiers, for discriminating faces in which the aforementioned angle is within a range of −90° to +90°, in 30° increments. That is, the profile face classifying means 22 comprises a total of 7 classifiers 22-1 through 22-7. Note that for example, the 0° out-of-plane rotated face classifier 22-1 is capable of discriminating faces which are rotated within a range of −15° to +15° with the center of rotational angular range being 0°. Note that each of the plurality of profile face classifiers 22-1 through 22-7 comprises a plurality of weak classifiers which have performed learning by the AdaBoosting algorithm, similar to those of the profile face candidate classifying means 21 (refer to FIG. 4). The profile face classifying means 22 performs discrimination by the same discrimination method as that employed by the profile face candidate classifying means 21.

Next, the forward facing face detecting means 30 will be described. The forward facing face detecting means 30 detects partial images PP that represent forward facing faces from among the plurality of partial images PP. The forward facing face detecting means 30 comprises a forward facing face candidate classifying means 31, and a forward facing face classifying means 32. The forward facing face candidate classifying means 31 discriminates whether each of the plurality of partial images PP represent forward facing faces, and outputs partial images PP that possibly represent forward facing faces to the forward facing face classifying means 32, as candidate images CP. The forward facing face classifying means 32 discriminates whether each of the candidate images CP detected by the forward facing face candidate classifying means 31 and output thereto represent forward facing faces.

The forward facing face candidate classifying means 31 functions to perform binary discrimination regarding whether the partial images PP represent forward facing faces. The forward facing face classifying means 31 comprises a plurality of classifiers, each constituted by weak classifiers which have performed learning by the AdaBoosting algorithm, similar to the profile face candidate classifying means 21 (refer to FIG. 4).

The forward facing face classifying means 32 comprises: a 0° forward facing face classifier 32-1, for discriminating faces in which the angle formed by the center lines thereof and the vertical direction of the images that they are pictured in is 0°; a 30° forward facing face classifier 32-2, for discriminating faces in which the aforementioned angle is 30°; and in-plane rotated face classifiers 32-3 through 32-12, for discriminating faces in which the aforementioned angle is within a range of 30° to 330°, in 30° increments. Note that for example, the 0° in-plane rotated face classifier 32-1 is capable of discriminating faces which are rotated within a range of −15° (=345°) to +15° with the center of rotational angular range being 0°. Because the raw images P0 and the green signal images P are of the same subjects, faces are present within the same regions in the raw images P as in the green signal images P. Accordingly, the face detecting means 10 is capable of detecting facial images FP within the raw images P0, by detecting the facial images FP within the green signal images P.

Note that each of the plurality of forward facing face classifiers 32-1 through 32-12 comprises a plurality of weak classifiers which have performed learning by the boosting algorithm, similar to those of the aforementioned profile face candidate classifying means 21 (refer to FIG. 4). The forward facing face classifying means 32 performs discrimination by the same discrimination method as that employed by the profile face candidate classifying means 21.

Here, each of the candidate classifiers 21, 31 and each of the face classifiers 22, 32 employs the green signal images P. That is, unlike conventional face classifiers that employ brightness data (Y signals) of the raw images P0, faces are discriminated employing the green signal images P. Conventionally, brightness data are employed as signals to discriminate faces. In this case, fluctuations in face detection due to individual differences such as skin color can be eliminated. However, data conversion based on human visual perception must be performed when extracting brightness data from RGB signals, according to the formula:

Brightness $Y=0.299R+0.587G+0.114B$

Figure 7:
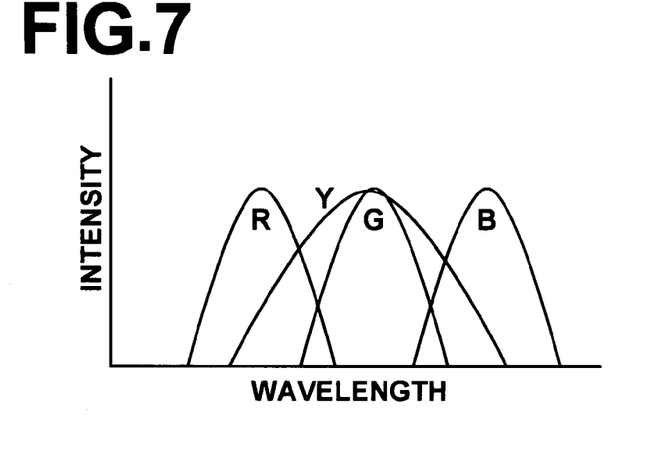
FIG. 7 is a graph that illustrates the relationships among RGB signals and brightness data.

As illustrated in FIG. 7 and in the above formula, the component of RGB signals of the partial images PP that include the most brightness data is the green signal. The weak classifiers of the face detecting means 10 focus on this point, and employ the green signal images P to perform discrimination. Therefore, the detection performance is substantially at the same level as that of conventional face detection employing brightness data, while the conversion process from RGB signals to brightness data becomes unnecessary. Accordingly, the face detection process can be accelerated.

Figure 8:
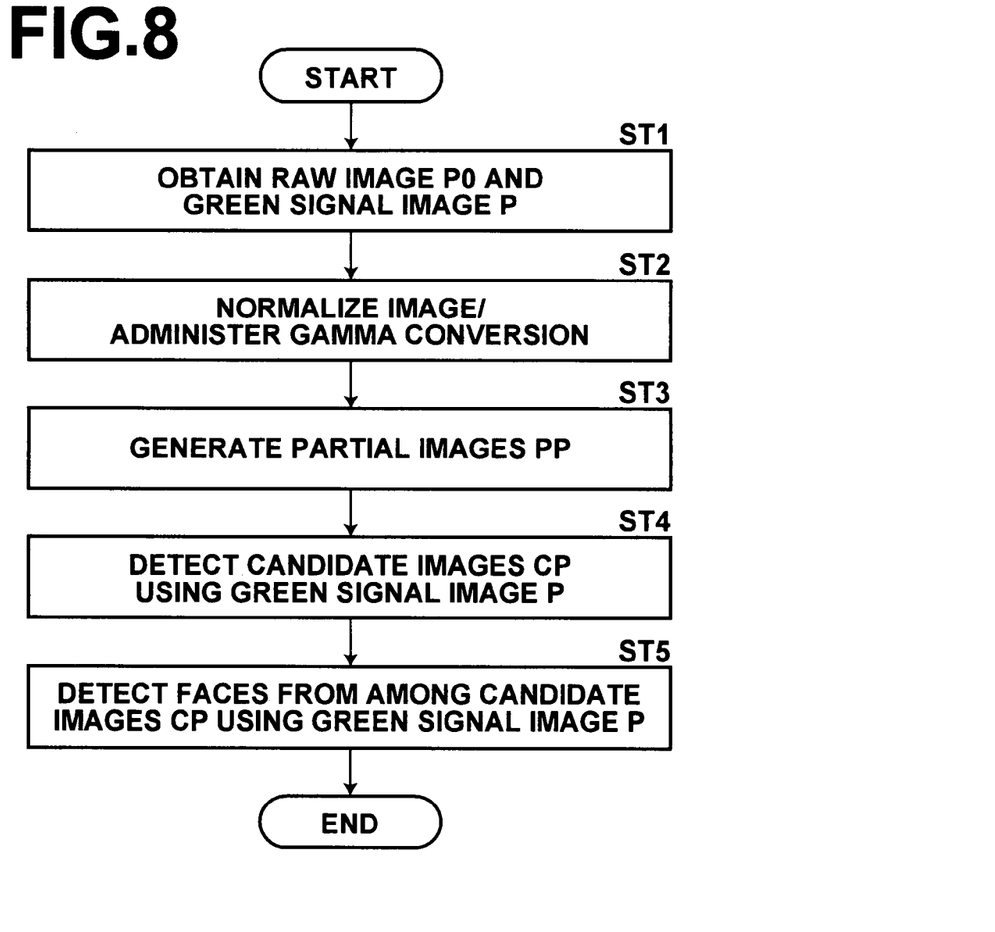
FIG. 8 is a flow chart that illustrates a preferred embodiment of the face detecting method of the present invention.

FIG. 8 is a flow chart that illustrates a preferred embodiment of the face detecting method of the present invention. The steps of the face detecting method will be described with reference to FIGS. 1 through 8. First, the imaging means performs imaging of a human subject, and obtains a plurality of pieces of pixel data Px, by the light receiving elements 2*a* receiving light of different color components respectively. Next, the image generating means 4 generates a raw image P0 as a color image from the plurality of pieces of pixel data Px, and a green signal image from green pixel data (step ST1). Then, the preliminary processing means 10*a* generates the multiple resolution images of the green signal image P, normalizes the multiple resolution images, and administers gamma conversion thereon (step ST2). Next, the partial image generating means 11 generates a plurality of partial images PP, by scanning the subwindow W within the green signal image P at uniform scanning intervals (step ST3).

Thereafter, each of the weak classifiers CF generate characteristic amounts based on the green signals within the partial images PP, whether the generated partial images PP represent faces is judged by the profile face candidate classifying means 21 or the forward facing face candidate classifying means 31, and candidate images CP that possibly represent faces are detected (step ST4). Next, the candidate images CP are further discriminated by the profile face classifiers 22 and the forward facing face classifiers 32, and whether the candidate images CP represent faces is discriminated (step ST5). Thereby, a facial image FP that represents a forward facing face or a face in profile is discriminated within the green signal image P.

According to the embodiment described above, the classifiers 21, 22, 31, and 32 detect facial images FP from within the raw images P by employing the green signal images P. Therefore, the extraction of brightness data from the RGB signals, which had heretofore been necessary, becomes unnecessary. Accordingly, the amount of calculations involved in the face detecting process can be reduced, and processing speeds can be improved.

Further, the face detecting means 10 comprises the partial image generating means 11, for generating a plurality of partial images PP by scanning a subwindow, which is a frame surrounding a set number of pixels; and face classifiers 21, 22, 31, and 32, for performing final discrimination regarding whether the plurality of partial images PP represent faces, employing discrimination results of a plurality of weak classifiers $CF_1$ through $CF_m$. Accordingly, detection of facial images FP can be performed efficiently and accurately.

Note the plurality of weak classifiers $CF_1$ through $CF_m$ are arranged in a cascade structure; and discrimination is performed by downstream weak classifiers only on partial images PP which have been discriminated to represent faces by upstream weak classifiers. Therefore, the number of partial images PP to be discriminated by downstream weak classifiers can be greatly reduced. Accordingly, the discriminating process can be further accelerated.

The present invention is not limited to the embodiment described above. For example, in the above embodiment, the candidate classifiers 21 and 31 are provided, as illustrated in FIG. 1. However, the face classifiers 22 and 32 may directly detect faces from within the partial images PP.

What is claimed is:

1. A face detecting method, comprising the steps of:
    receiving light incident from a human subject for each color component, to obtain a plurality of pieces of pixel data;
    generating a raw image of the human subject employing the obtained plurality of pieces of pixel data;
    generating a green signal image employing green pixel data, which are among the plurality of pieces of pixel data, obtained by receiving green components of light from the human subject; and
    detecting a facial image within the raw image by detecting the facial image within the green signal image.

2. A photography apparatus, comprising:
    imaging means, for receiving light incident from a human subject for each color component, to obtain a plurality of pieces of pixel data;
    image generating means, for generating a raw image of the human subject employing the obtained plurality of pieces of pixel data and for generating a green signal image employing green pixel data, which are among the plurality of pieces of pixel data, obtained by receiving green components of light from the human subject; and
    face detecting means, for detecting a facial image within the raw image by detecting the facial image within the green signal image.

3. A photography apparatus as defined in claim 2, wherein the face detecting means comprises:

partial image generating means, for generating a plurality of partial images by scanning a subwindow, which is a frame surrounding a set number of pixels; and face classifiers, for performing final discrimination regarding whether the plurality of partial images represent faces, employing discrimination results of a plurality of weak classifiers.

4. A photography apparatus as defined in claim 3, wherein:

the plurality of weak classifiers are arranged in a cascade structure; and discrimination is performed by downstream weak classifiers only on partial images which have been discriminated to represent faces by upstream weak classifiers.

5. A photography apparatus as defined in claim 3, wherein:

the face detecting means further comprises a candidate detecting means, for discriminating whether the partial images represent faces and detecting partial images that possibly represent faces as candidate images; and the face classifiers discriminate whether the candidate images detected by the candidate detecting means represent faces.

6. A photography apparatus as defined in claim 2, wherein:

the face detecting means performs face detection after administering a gamma process on the green signal image.

* * * * *